United States Patent
Ramachandra et al.

(10) Patent No.: US 10,225,337 B2
(45) Date of Patent: Mar. 5, 2019

(54) MODELING AND FORECASTING RESERVE CAPACITY FOR OVERBOOKED CLUSTERS

(71) Applicant: Microsoft Technology Licensing, LLC, Redmond, WA (US)

(72) Inventors: Karthik Saligrama Ramachandra, Madison, WA (US); David Johns DeWitt, Madison, WI (US); Shize Xu, Redmond, WA (US); Qun Guo, Bellevue, WA (US); Ajay Kalhan, Redmond, WA (US); Peter Alan Carlin, Seattle, WA (US); Willis Lang, Edina, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 15/199,590

(22) Filed: Jun. 30, 2016

(65) Prior Publication Data
US 2018/0007128 A1    Jan. 4, 2018

(51) Int. Cl.
*G06F 17/30* (2006.01)
*H04L 29/08* (2006.01)

(52) U.S. Cl.
CPC .......... *H04L 67/1025* (2013.01); *G06F 17/30* (2013.01)

(58) Field of Classification Search
CPC ................ H04L 67/1025; H04L 69/03
See application file for complete search history.

(56) References Cited

U.S. PATENT DOCUMENTS

| 8,806,003 | B2 | 8/2014 | Brown et al. |
| 8,862,738 | B2 | 10/2014 | Madduri et al. |
| 2002/0013832 | A1 | 1/2002 | Hubbard |

(Continued)

FOREIGN PATENT DOCUMENTS

EP    2701064 A1    2/2014

OTHER PUBLICATIONS

Ying, Liu, "Sponge: An Oversubscription Strategy Supporting Performance Interference Management in Cloud", In Journal of China Communications, vol. 12, Issue 11, Nov. 2015, pp. 196-209.

(Continued)

*Primary Examiner* — Philip J Chea
*Assistant Examiner* — Robert B McAdams
(74) *Attorney, Agent, or Firm* — Workman Nydegger (57) ABSTRACT

Managing cluster resources for a cluster. The method includes identifying a plurality of quiescence policies. Each of the quiescence policies define one or more conditions for cluster entities which when met, identify that cluster resources should be reclaimed from cluster entities by quiescing cluster entities. The method further includes, for each quiescence policy, identifying an amount of reclaimed capacity defining the amount of cluster resources that will be reclaimed by implementing the quiescence policy. The method further includes, for each quiescence policy, identifying an amount of reserve capacity defining the amount of cluster resources that should be reserved for resuming quiesced cluster entities. The method further includes; selecting a quiescence policy based on comparing the reclaimed capacities and reserve capacities for the quiescence policies. The method further includes, booking cluster resources for cluster entities on the cluster according to the selected quiescence policy.

18 Claims, 4 Drawing Sheets

(56) References Cited

U.S. PATENT DOCUMENTS

| | | | |
|---|---|---|---|
| 2009/0157880 A1* | 6/2009 | Lee | H04L 12/2807 709/226 |
| 2010/0037225 A1* | 2/2010 | Doyle | G06F 1/3203 718/102 |
| 2015/0281339 A1* | 10/2015 | Strassner | H04L 41/0893 709/224 |
| 2016/0196445 A1* | 7/2016 | Allen | G06F 21/6245 726/26 |
| 2016/0283270 A1* | 9/2016 | Amaral | G06F 9/5027 |

OTHER PUBLICATIONS

Urgaonkar, et al., "Resource Overbooking and Application Profiling in a Shared Internet Hosting Platform", In Journal of ACM Transactions on Internet Technology, vol. 9, No. 1, Feb. 2009, pp. 1-34.

Unuvar, et al., "Cloud Overbooking Through Stochastic Admission Controller", In Proceedings of 10th International Conference on Network and Service Management, Nov. 17, 2014, pp. 320-323.

Tomás, et al., "Improving Cloud Infrastructure Utilization through Overbooking", In Proceedings of the ACM Cloud and Autonomic Computing Conference, Aug. 5, 2013, 10 pages.

Tomas, et al., "The straw that broke the camel's back: safe cloud overbooking with application brownout", In Proceedings of International Conference on Cloud and Autonomic Computing, Sep. 8, 2014, 10 pages.

Bouterse, et al., "Scheduling Cloud Capacity for Time-Varying Customer Demand", In Proceedings of IEEE International Conference on Cloud Networking, Nov. 28, 2012, 6 pages.

Litzkow, et al., "Condor—A Hunter of Idle Workstations", In Proceedings of 8th International Conference on Distributed Computing Systems, Jun. 13, 1988, pp. 104-111.

\* cited by examiner

MODELING AND FORECASTING RESERVE CAPACITY FOR OVERBOOKED CLUSTERS

BACKGROUND

Background and Relevant Art

To lower hosting costs and service prices, database-as-a-service (DBaaS) providers strive to maximize cluster utilization without negatively affecting their users' service experience. Some of the most effective approaches for increasing service efficiency result in the over-booking of the cluster with user databases. For instance, one approach is to reclaim cluster capacity from a database when it is idle, temporarily re-using the capacity for some other purpose, and over-booking the cluster's resources.

However, these approaches can result in challenges when a database that has had its resources reclaimed by the cluster attempts to become active again. In particular, capacity (such as compute, storage, and network resources) will need to be located for these databases, and there is some cost to making the databases active again. Thus, it is desirable to more optimally reclaim cluster capacity from idle databases.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for managing cluster resources for a cluster. The method includes identifying a plurality of quiescence policies. Each of the quiescence policies define one or more conditions for cluster entities which when met, identify that cluster resources should be reclaimed from cluster entities by quiescing cluster entities. The method further includes, for each quiescence policy in the plurality of quiescence policies, identifying an amount of reclaimed capacity defining the amount of cluster resources that will be reclaimed by implementing the quiescence policy. The method further includes, for each quiescence policy in the plurality of quiescence policies, identifying an amount of reserve capacity defining the amount of cluster resources that should be reserved for resuming quiesced cluster entities. The method further includes selecting a quiescence policy from among the plurality of quiescence policies based on comparing the reclaimed capacities and reserve capacities for the quiescence policies in the plurality of quiescence policies. The method further includes, booking cluster resources for cluster entities on the cluster according to the selected quiescence policy This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

One of the main challenges of a database-as-a-service (DBaaS) provider is to control costs (and lower prices) while providing an excellent service for users. The efficiency challenge is to maintain high user density (and utilization levels) on these clusters without noticeable disruption to the users' workloads.

Embodiments illustrated herein can help to address problems that often occur when striving for high service efficiency. In particular, embodiments can manage the capacity-related side-effects of employing over-booking policies. This can result in a more efficient cluster service that is able to effectively manage more tenant databases and/or more quickly handle user requests to tenant databases.

For example, after aggressive overbooking, due to a change in cluster-wide usage, a cluster can suddenly find that it owes more capacity to tenants than it actually has.

Consider a straight-forward multi-tenant mechanism that can be used—reclaiming capacity when a user is idle for a prolonged time. Certain DBaaS architectures trade-off higher performance isolation and manageability at the expense of lower user density and efficiency by focusing on modularity. In some architectures, a database server instance process can be considered as acting as a quasi-virtual machine, that dispatches queries for its attached databases. For certain tiers of cluster subscribers, these attached databases are backed by files stored via a "shared disk" architecture. While these databases are attached, the instance process is up and consuming cluster capacity. However, if the system "detaches" a database from the instance, (when the database is idle,) then this database server instance may be shut down and its resources can be reclaimed. When a query is issued, an instance is brought back online in the cluster wherever the necessary capacity is available and the database is re-attached. This suggests an immediate opportunity: if databases are idle for considerable periods of time, then embodiments can detach them from the server instance to reclaim capacity for other databases—effectively quiesce them. This act can immensely boost cluster utilization.

There are certain problems that arise from employing this mechanism and over-booking a cluster. For example, in any given day, at any given time, some of the customers may not be present to occupy cluster resources. When this happens, given the under-utilization of the cluster, additional customers may be accommodated in the resources. At a holistic view, as long as there is a net-positive (or net-zero) increase of free resources, this is sustainable. Unfortunately, sometimes, more resources are being claimed than freed, a net-negative trend. As a result, the cluster may need to dedicate some reserved capacity to handle net-negative capacity changes.

Embodiments can address this challenge by employing quiescence techniques to over-book the cluster—a set reserve capacity is kept on hand for when quiesced databases require resources and need to be resumed.

In a cloud service, there are generally periods of ebb and flow in user activity (e.g., weekends and holidays), where there are sustained periods of net-positive and net-negative quiescence. However, there is a challenge related to how long embodiments should wait before quiesceing an idle database and providing the capacity to some other database.

One straightforward approach is to hypothesize that if the database has been idle for a static amount of time, then it is likely to continue in this way and hence it is safe to quiesce. This duration of idle time can be defined by an idleness based quiescence policy. The quiescence policy has a direct implication on the amount of reserve capacity that should be kept on hand, as well as the amount of capacity that can be reclaimed. Note however, that while the efficiency of the quiesce mechanism may help mitigate this issue to some extent, the act of over-booking itself creates the possibility of zero available capacity that cannot be solved fully by any degree of mechanism improvement.

Embodiments can therefore be implemented, which, given a production cluster (and users), to find its "ideal" quiescence policy. In some embodiments, this can be done by modeling a cluster over time. For example, embodiments can use production telemetry data to determine user activity and idle periods as an input into a quiescence model. In the modeling, embodiments can use different quiescence policy lengths (the idle time required before embodiments initiate the mechanisms to reclaim resources). For each policy, embodiments calculate the amount of net churn of databases quiesced and resumed over a period of time, such as for example a three-month time period. As embodiments model quiescence the embodiments can determine how much potential capacity will be reclaimed with this mechanism.

Typically, as policy length is shortened, the amount of capacity reclaimed increases. For example, one real world model identified that when policy length was decreased from 7 days to 1 hour, the amount of capacity reclaimed increased by almost 30%.

However, there is a corresponding climb in the required reserve capacity to ensure capacity for databases that need to be resumed. In particular, the number of databases resumed per minute climbs dramatically as the policy length is shortened. This would increase the operational complexity and may sometimes decrease user satisfaction.

Embodiments can attempt to optimize the policy by attempting to normalize databases resumed per minute so that embodiments can arrive at a single measure per policy length. For example, some embodiments can do this by assuming that if a database is resumed more than five times in a month, then a capacity compensation (of one month) will be provided.

As used herein, the net reclaim potential=(reclaim_potential−reserve_capacity−compensated capacity). This analysis helps to compare various policies to identify better performing policies.

Different clusters exhibit very different activity patterns. Thus, embodiments may be implemented that are able to continuously forecast, monitor, and adjust reserve capacities in a production setting. Thus, embodiments may implement a predictive model for the amount of reserve capacity.

Embodiments may include the ability to identify penalty measures for various quiescence policies for forecasting models which show how well a policy would have done. Penalty measures, such as a capacity outage when databases are resumed but no reserve capacity is available (over-aggressive forecasting) and unused reserve capacity (over-conservative forecasting), may be identified.

Additional details are now illustrated.

Figure 1:
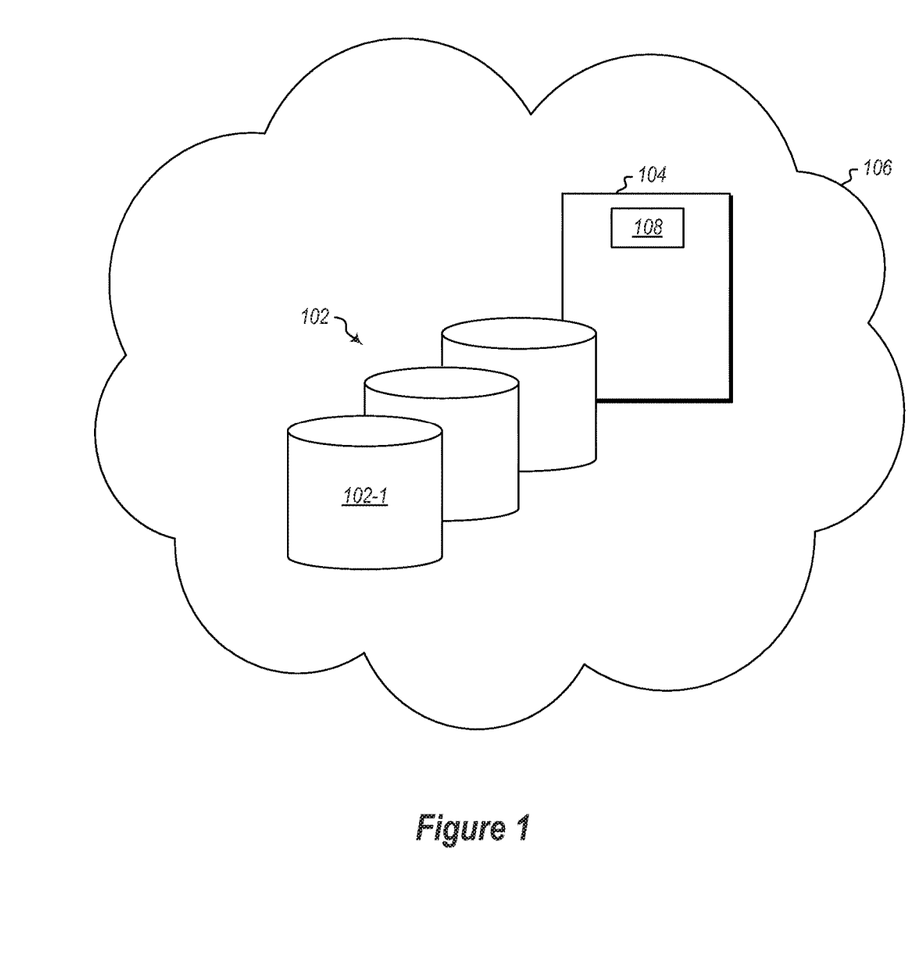
FIG. 1 illustrates a cluster configured to manage cluster entities.

With reference now to FIG. 1, some databases, such as Azure SQL database, available from Microsoft Corporation of Redmond, Wash. operate on a process-oriented model where multiple customer databases 102 may be co-located and served together via a single database server process 104. Given that a given database (e.g., database 102-1) is backed by database server 104, many of the basic database management concepts of on-prem database server remain available to a cluster 106 hosting the databases 102 and database server 104. Most notably, embodiments could use a database server detach/attach mechanism (as an example mechanism) that allows a database 102-1 to be "disconnected" from the database server 104 instance process. After the database 102-1 is detached, its physical files can be moved or reattached by any other database server instance and the database 102-1 will then consume resources provided by the new instance.

Note that this mechanism is not free. For example, detaching a database 102-1 can take minutes or longer depending on the volume of dirty memory pages in the buffer pool and I/O latency. Other factors can influence the latency of a reattach as well.

Some database cluster offerings include a tiered subscription model that allows customers to choose from databases with different subscription levels, also known as 't-shirt' sizes. T-shirt sizes correspond not only to various levels of performance, but also availability, and reliability objectives. One current subscription model includes three tiers: Basic, Standard, and Premium (in the illustrated example, Standard and Premium are further subdivided into four and three sub-level t-shirt sizes, respectively.) The main difference that sets Premium databases apart is that the user's physical data files are stored locally on the same node that hosts the database server instance. This distinction provides immense benefits in performance, but the cluster 106 must now manage physical data file replication on other database nodes for availability.

On the other hand, Basic and Standard tier databases are backed by physical files stored on a "shared-disk" layer, which performs replication, thereby providing availability. For these two tiers, embodiments can attach and detach databases at will, changing the location of the engine within the cluster. Databases subscribing to these two lower-cost tiers also make up the vast majority of all databases in the service.

Finally, all of the t-shirt sizes come with performance service level objectives (SLOs) that essentially define the capacity requirements of a particular database. These are defined using a metric 'database transaction unit' (DTU), which is an internal transactional benchmark metric. Internally, these DTUs map to traditional CPU core, memory, and I/O bandwidth metrics.

A quiesce mechanism that is relatively straight-forward to implement (and think about) in database server 104 is the act of detaching a database 102-1. When the database 102-1 is detached, it can no longer service queries as the database engine 108 no longer has access to the data for the database 102-1.

When a database server database detach is invoked, certain memory and log operations may need to be performed and/or completed. This includes memory resident data checkpointing which can take a non-trivial amount of time to complete (minutes or longer). Conversely, if the user requests a data page from a quiesced database, then it must be "resumed", which would include invoking database server's database attach function. Similarly, this is not an instantaneous action as the database's physical files stored in the "shared disk" layer must be found, sufficient free capacity for the database's subscription tier must be found, and the attach itself performed. Therefore, both of the transitions—quiesce and resuming—need to be accounted for.

Figure 2:
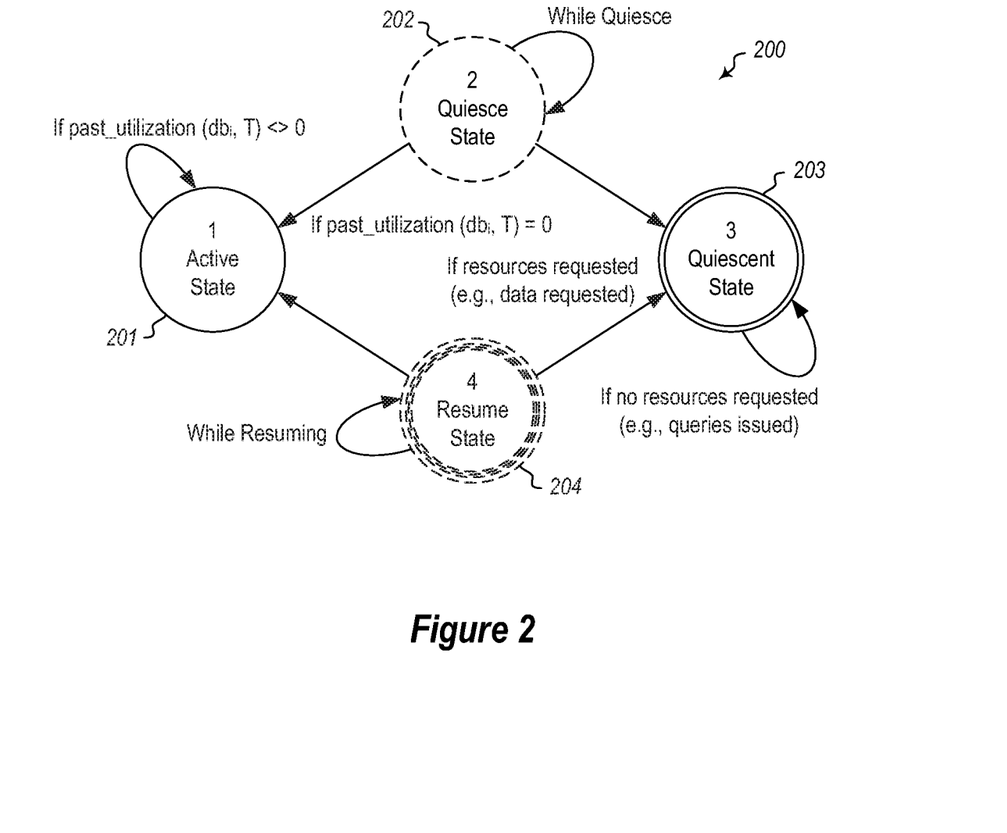
FIG. 2 illustrates a quiescence state machine.

FIG. 2 illustrates an intuitive four-state state diagram 200 for a quiesce/resume workflow. A database can be modeled as being in one of four states: (1) Active 201; (2) Quiesce 202; (3) Quiescent 203; and (4) Resuming 204. In the illustrated example, databases remain in state 201 if there is any level of utilization in the past p length timespan. If sufficient idleness is detected, the database is transitioned to state 202 where it stays until the quiesce process is completed and it moves onto state 203. While there are no requests of this database, it remains in the quiescent state 203. Once a database receives a request, it transitions to state 204 and stays there until resume completes, at which point it returns to state 201. Note that this detach/attach mechanism is only used here as a simplified example, and may not represent any real or complete mechanism.

Using the above mechanism, embodiments may attempt to increase service efficiency by reclaiming cluster resources from databases that are idle (e.g., by detaching such databases), and using the reclaimed capacity to host more databases.

Embodiments further include functionality for deciding which databases should be detached. In some embodiments, an approach to identify the right quiesce candidates is referred to as the quiescence policy. While there could be several quiescence policies possible, a set of policies based on the duration of idleness exhibited by databases is shown herein. The idleness-based quiescence policy P is defined as follows: A database is deemed to be a candidate for quiesce if it exhibits continuous idleness for a specified duration T, which is referred to herein as the quiescence policy length. The idleness-based quiescence policy P is parameterized by the policy length T, and is based on the hypothesis that if a database has remained idle for time T, it is likely to remain idle for a longer duration and hence, is a suitable quiesce candidate.

Enforcing a quiescence policy P(T) involves quiescing the databases that are identified by the policy, thus freeing up the corresponding cluster resources, including one or more of compute resources, memory resources, storage resources, or network resources. The amount of resources that would free up as a result of applying policy P(T) is referred to as the reclaim potential of P(T).

However, enforcing a quiescence policy also implies that some fraction of the quiescent databases may have to be resumed. There are continually databases being quiesced and resumed, so the net churn is of concern in these databases. In the case of negative net churn (where more databases are resuming than being quiesced), embodiments need to accommodate these resumed databases by reserving certain cluster resources. The reserve capacity required to enforce a policy is essentially the capacity necessary for the continuous swings in the net churn. The cost of maintaining this reserve is the reserve capacity cost of P(T).

Another important factor that needs to be considered here is the resume cost. Resume incurs costs because they involve operations that include bringing back an instance online in the cluster wherever the necessary capacity is available, and re-attaching the database to it.

Too many databases being resumed can increase operational complexity and may even lead to dissatisfied customers, and hence is not desirable. Therefore, embodiments can account for the resume cost by making a pessimistic assumption. For example, embodiments may be configured to assume that if a database is resumed more than 5 times in a month, (assuming resume takes 1 minute,) it fails a 99.99% SLA, and has to be compensated in capacity. The capacity compensation incurred due to enforcing a policy may be part of the resume cost of a policy P(T).

Therefore, the total policy cost of a quiescence policy is the sum of its resume cost and the cost of the reserve capacity. Assuming that this cost is fulfilled from the reclaim potential, the net reclaim potential of P(T) can be calculated by subtracting the total policy cost from its reclaim potential or, more formally: net_reclaim_potential=reclaim potential−reserve capacity cost−resume cost.

The following now illustrates details with respect to determining quiescence policies P(T) for attempting to optimize reclaim potential. Observe that there is a trade-off here between the reclaim potential and the total policy cost.

Once a policy is chosen, one aspect of enforcing the policy is to reserve a certain amount of cluster resources for databases that may need to be resumed. Note that this reserve capacity can be a function of the chosen quiescence policy. Alternatively or additionally, the reserve capacity can vary with time. Several factors such as weekends, holidays, special events etc. can impact the usage patterns of databases on the cluster 106, and implicitly impact both quiesce and resume rates. Further, as the cluster 106 takes on (and loses) customers the aggregate behavior of the database population may change. Therefore, embodiments may be configured to be able to continuously forecast the reserve capacity required in the future. This forecasting, based on observed patterns of resource utilization, should be robust enough to withstand variations in resource utilization.

Given the resource utilization telemetry data (e.g., sample data collected for a database or set of databases) and a quiescence policy P(T), embodiments can be configured to evolve robust prediction and evaluation schemes for forecasting the reserve capacity.

Predicting reserve capacity in a conservative manner may be safe in terms of reducing the resume cost. However, the downside of conservative predictions is that it may result in reserve cluster capacity that may remain unused. This defeats the goal of increasing the density of databases on the cluster. On the other hand, aggressive predictions may increase the number of databases by over-booking to a large extent, but may end up in a situation where there may be insufficient cluster capacity for databases that need to be resumed. Therefore, robust prediction schemes that can balance these constraints may be preferable.

The following illustrates how embodiments start with the raw, analog telemetry data, discretize it to a basic binary signal, and then apply different quiescence models by varying the policy P(T).

In some embodiments, the raw telemetry data that serves as the input to all of this contains a row per database per timepoint if the database was not-idle (i.e., at least one performance metric's value was non-zero.) Given this property of the raw data, it is straightforward to convert the "analog signal" into a binary one of "activity" or "idle". Embodiments fit the binary data into the state machine (as shown in FIG. 2) by applying some chosen policy length T. Notice that: (1) the first long idle period is significantly reduced when embodiments transform it into quiescent state 203 because the policy P(T) causes T amount of idle time to be spent in the active state 201; (2) that the second idle period is completely eliminated because it is shorter than length T; and (3) embodiments account for all quiesce and resume time in the model processing. In this example, embodiments also make a simplifying assumption that a database can be dropped from the quiescent state.

The following introduces formalism to help describe the cluster-level capacity bookkeeping. As noted previously, embodiments can use the state machine illustrated in FIG. 2. Given these states, at any point in time that a database exists, it is found in one of these four states:

while a database $db_i$ exists in timespan[j, k), state ($db_i$, t, s) $\in \{1, 0\}$ indicates whether of not $db_i$ is in state s at time t, where j≤t≤k; k=∞ if $db_i$ is not dropped Embodiments can determine the minimum capacity requirement for any database in terms of a minimum CPU reservation in unit "cores". This may be defined as:

$$\text{capacity\_map}_{(db_i)} \in R^+$$

provides the mapping between a database $db_i$ and its CPU core capacity reservation For simplicity, assume that a database never changes its core capacity reservation although, embodiments can easily extend the preceding definition by adding a time component.

With the above, for any state of interest, embodiments can compute the total number of databases (and correspondingly, the capacity in CPU cores,) at any point in time. For instance, the equation below defines how embodiments can compute the total capacity units (in cores) spent in the resume state 4 between minutes 580 and 600.

$$\text{for state 4:} \sum_{t=580}^{600} \sum_{\forall db_i} \text{state}(db_i, t, 4) \times \text{capacity}_{map}(db_i)$$

With the methods described above, embodiments can model quiescence policies with different quiescence policy lengths. A careful and systematic analysis of these models can be used to attempt to optimize quiescence policy length. To compare quiescence policies and to forecast and evaluate the reserve capacity, certain metrics used for some embodiments were defined above. The following now makes those definitions more concrete, and show how they are computed.

Figure 3:
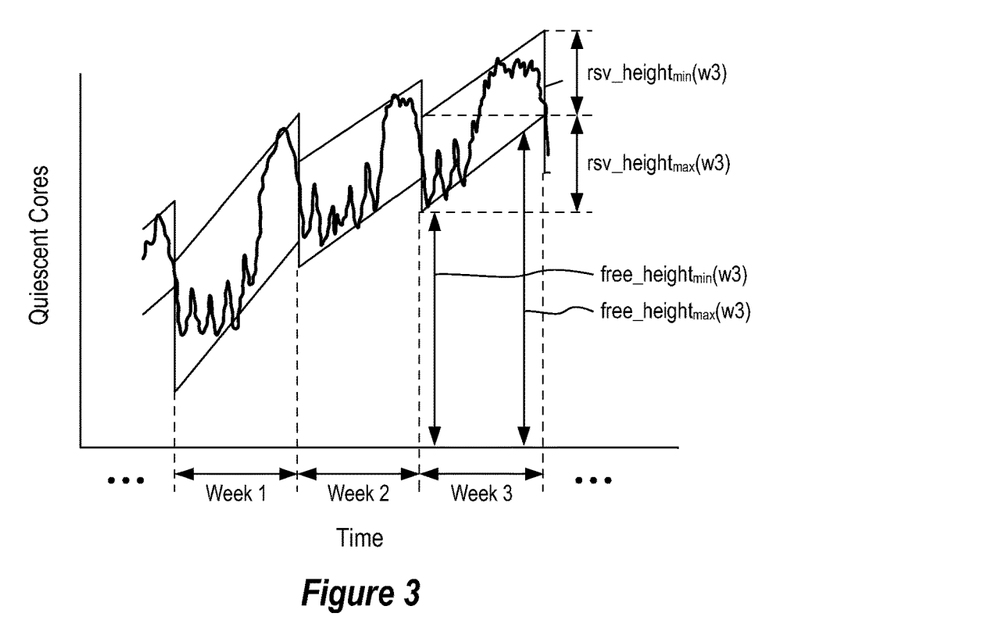
FIG. 3 illustrates quiescence patterns and bounding polygons over a three week period using a given quiescence policy.

Reclaim potential is the amount of cluster resources that would free up due to enforcing policy P for a specified duration. In some embodiments, this is measured in terms of core minutes, denoted by reclaim potential(P). In FIG. 3, the entire area under the polygons is a measure of the cores that are always in a quiescent state, which is, in other words, the capacity that is now reclaimed due to quiescence. For N weeks, the reclaim potential of policy P is given by the following equation:

$$\sum_{w=1}^{N} \frac{1}{2}(\text{free\_height}_{min}(w) + \text{free\_height}_{max}(w)) \times \text{minutes}(w)$$

where $\text{free\_height}_{min}(w)$ and $\text{free\_height}_{max}(w)$ are respectively the minimum and the maximum heights under the polygon shown in FIG. 3 for week w, and minutes(w) is the number of minutes in the week.

The following illustrates details with respect to cost of reserve capacity. This defines the amount of reserve capacity required if policy P has to be enforced for a specified duration. In other words, this is essentially the net number of databases resumed that was observed, and have to be accommodated. This is measured in terms of core minutes and denoted by cost of reserve(P). In the example illustrated in FIG. 3, a net positive resume number is indicated by a downward trend in the number of quiescent cores. For a single day, the number of databases resumed that have to be accommodated is equal to the net decrease in the number of quiescent cores observed within that day. In one illustrated example, accumulating this over a one-week duration, embodiments can identify the required cost of reserve(P) as follows. The dashed polygons that bound the quiescence pattern in FIG. 3 encapsulate the "churn" of quiesce and resume for every week. Therefore the area of this polygon is equal to the cost of reserve(P) for a given week. In general, for N weeks, the cost of reserve capacity is given by the following equation:

$$\sum_{w=1}^{N} \frac{1}{2}(\text{rsv\_height}_{min}(w) + \text{rsv\_height}_{max}(w)) \times \text{minutes}(w)$$

Where $\text{rsv\_heightm}_{min}(w)$ and $\text{rsv\_height}_{max}(w)$ are respectively the minimum and the maximum heights of the polygon for week w and minutes(w) is the number of minutes in the week.

As described above, it is not desirable to incur too many databases resumed. Therefore, embodiments can account for the resume cost by making a pessimistic assumption that if a database is resumed more than 5 times in a month, it has to be compensated in capacity since it fails the 99.99% database SLA. The capacity compensation incurred due to enforcing a policy for a specified duration is the resume cost of a policy P(T) and is denoted as resume cost(P).

In some embodiments, the capacity compensation policy that may be used is as follows. Consider a database belonging to subscription tier Y that is resumed more than 5 times in a month. Then, embodiments compensate such a database with a 30 day reservation of tier Y subscription. This essentially translates to the CPU core capacity reservation given above for that database for 30 days. In other words, customers may be compensated with no-cost to the customer capacity due to an SLA not being met. This cost may also be factored into selecting a quiescence policy.

The following illustrates details with respect to net reclaim potential, which is the amount of cluster resources that would become available due to enforcing policy P for a specified duration, after incorporating all the costs involved. The total cost of enforcing policy P includes the cost of the reserve capacity (cost of reserve(P)) and the cost due to resume compensation that violate the SLA resume cost(P). This is computed as described above.

The following now illustrates details with respect to comparing quiescence policies. As stated earlier, embodiments attempt to identify more optimal quiescence policies P(T) that lead to the maximum net reclaim potential. This can be done by comparing the set of policies under consideration, based on the metrics defined above. These comparisons can be performed as totals to get an overall idea of the reclaim potential over the entire duration under consideration. Another alternative that can help make this decision is to observe the behavior of the costs on a week-by-week basis, and study their variance over time.

Embodiment further include functionality for forecasting reserve capacity. Intuitively, reserve capacity is the height of the "churn" of quiesce and resume observed. In these terms, forecasting reserve capacity essentially translates to predicting the height of this churn, for a specific duration in the future.

For evaluating models, some embodiments use the standard cross validation approach to estimate how accurately the model works in practice. Embodiments can first train a model on a training data set, which yields a prediction. Subsequently, this prediction is validated against a validation data set. The goal of cross validation is to define a dataset to "test" the model in the validation phase, to limit problems like overfitting and give an insight on how the model will generalize to an unknown (future) dataset.

Consideration may be given regarding the ratio of durations for training and prediction. Considering a large duration for training might improve the accuracy and robustness of predictions. However, it may be useful to implement embodiments where predictions are not unnecessarily biased by past anomalies. Considering this trade off, some embodiments have currently implemented a (e.g., 2 week:1 week) training:validation ratio.

Another factor that influences this decision is the granularity of prediction that is required. In production, in the illustrated examples, this forecasting may be performed on a weekly basis, therefore embodiments predict for a duration of one week. In general, given a training-validation ratio of t:v (where t and v are measured in weeks), embodiments implement a sliding window of (t+v) weeks duration.

Figure 4:
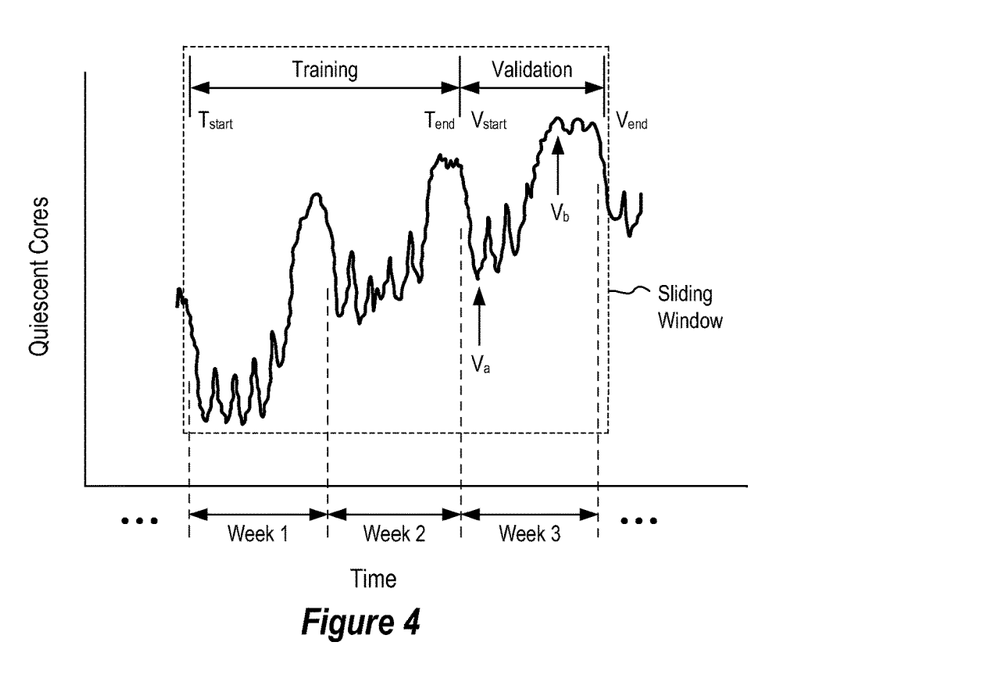
FIG. 4 illustrates a graph illustrating training and validation for forecasting reserve capacity.

FIG. 4 shows the sliding window of 3 weeks corresponding to a 2:1 training-validation ratio. The training is performed on the first t weeks. The predictions yielded in the training phase are validated on the v weeks of validation duration. Then, in the illustrated example, embodiments slide the window by a week, and repeat the procedure.

The following describes the training and validation phases in detail.

The training phase is shown in FIG. 4, with time points $T_{start}$ and $T_{end}$ indicating its start and end times. For every week of the training period (2 weeks in this case), embodiments bound the quiesces and resumes using polygons as shown in FIG. 3. Then, embodiments compute the maximum height of all the polygons seen during training. Let this maximum height be $Train_{max}$. Intuitively, $Train_{max}$ is the largest churn seen during training. $Train_{max}$ itself is a good indicator of the required reserve capacity for the following validation period. Therefore, embodiments derive simple prediction schemes as functions of $Train_{max}$. The output of the training phase is the predicted reserve capacity C which is given by the following equation:

$$C = f(Train_{max})$$

While complex prediction strategies are possible, some embodiments may attempt to choose the simplest strategy that performs well in production. Therefore, embodiments may consider simple functions of $Train_{max}$ that tilt the predictions to be either aggressive or conservative.

Some prediction strategies are given below:

$$f(Train_{max}) = \begin{cases} 1.75 \times Train_{max}, \\ 1.5 \times Train_{max}, \\ 1.25 \times Train_{max}, \\ Train_{max}, \\ 0.75 \times Train_{max}, \end{cases}$$

During the validation phase, embodiments can use the value predicted in the training phase (C) as the available reserve capacity. Then, the time series is played out for the entire validation period. While playing out the time series, the reserve capacity is used to allocate resources whenever resumes occur. Conversely, when quiesce occurs, the reclaimed capacity is added to the reserve, until the predicted capacity(C) is reached. As an illustration, consider the validation phase shown in FIG. 4. The time points $V_{start}$ and $V_{end}$ indicate the start and end points of the validation phase respectively. Let C denote the predicted reserve capacity based on the training. At the beginning of the validation phase (i.e. at $V_{start}$), some of the reserved capacity might already be in use, and hence embodiments cannot assume that the entire capacity C is available. Embodiments therefore make a conservative estimate of the initial state of the reserve capacity during the validation phase. Let $DC[T_{start}:T_{end}]$ denote the series of quiescent cores during the training phase and $DC[V_{start}]$ denote the number of quiescent cores at time $V_{start}$. Embodiments conservatively assume that the reserve usage at the beginning of the validation phase (ReserveUsage[$V_{start}$]) is given by the following equation:

$$ReserveUsage[V_{start}] = \max(DC[T_{start}:T_{end}]) - DC[V_{start}]$$

From this equation, it follows that the available reserve capacity at the start of the validation phase (denoted as AvailableReserve[$V_{start}$]) is given by:

$$AvailableReserve[V_{start}] = C - ReserveUsage[V_{start}]$$

With the above reserve capacity, a validation phase starts, playing out every time point. Consider the time point $V_a$ in FIG. 4, a local minimum point during week 3. Between $V_{start}$ and $V_a$, there is a steep decrease in the number of quiescent cores, which essentially means that there have been a series of resumes during this period. This intuitively makes sense since $V_a$ corresponds to the Monday activity after a weekend. By the time the validation phase reaches $V_a$, all the databases that have been resumed between $V_{start}$ and $V_a$ have received resources from the reserve capacity. Therefore, the reserve capacity that is available at $V_a$ (AvailableReserve[$V_a$]) would be $$AvailableReserve[V_a]_{-(DC[V_{start}]-DC[V_a])} = AvailableReserve[V_{start}]$$

Consider another time point $V_b$ in FIG. 4, which corresponds to a local maximum point during week 3. Observe that there is a steep increase in the number of databases quiesced just before $V_b$. By the time the validation phase reaches $V_b$, all the databases quiesced prior to $V_b$ lead to freed capacity, which in turn goes back to the reserve capacity. Thus, at every point through the validation phase, the AvailableReserve goes up and down according to the quiesce and resume actions that have occurred. For each minute time unit during the validation phase, information about the state of the cluster is captured.

Embodiments capture information about unavailable cores, unavailable minutes, and unused reserve capacity, which is then aggregated over the required duration.

The following illustrates details with respect of unavailable cores: If there are many more databases resumed than the forecasted value, the reserve capacity gets fully used up, thereby leading to a situation where resuming databases can no longer be accommodated in the cluster. This means that some resume actions fail due to unavailable capacity; this points to a non-robust prediction strategy. At every time unit during validation, embodiments keep track of the number of cores that were required for resume but were unavailable.

The following illustrates details with respect of unavailable minutes. Similar to unavailable cores, this metric captures the duration in which databases could not be resumed. This is an indicator of the robustness of the prediction strategies.

The following illustrates details related to unused reserve capacity. If there are fewer observed databases resumed than predicted by a model, the reserve capacity remains unused during that time period. Having a lot of unused reserve capacity reduces the utilization levels of the cluster, which is counterproductive. Therefore, this metric captures the extent of reserve capacity that remains unused, due to a choice of a prediction strategy.

These data points, i.e., unavailable cores, unavailable minutes, and unused reserve capacity, provide a generic way to compare different prediction strategies and measure their robustness and accuracy. An aggressive prediction strategy would have lesser unused reserve capacity, but may lead to more unavailable cores and minutes. On the other hand, a conservative prediction may avoid the situation of unavailable capacity for resumed databases, at the cost of higher unused reserve capacity. This comparison helps in making a choice of how aggressive or conservative embodiments wish to be.

At the end of the validation phase, the results are consolidated, and the sliding window moves ahead by a week. The entire forecasting process is repeated similarly.

During the validation phase, embodiments play out the time series by using the predicted reserve capacity and capture information about the state of the cluster that helps in evaluating prediction strategies.

Note that while database examples have been illustrated herein, it should be appreciated that the principles described above could be applied to other examples, such as other cluster provided services The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
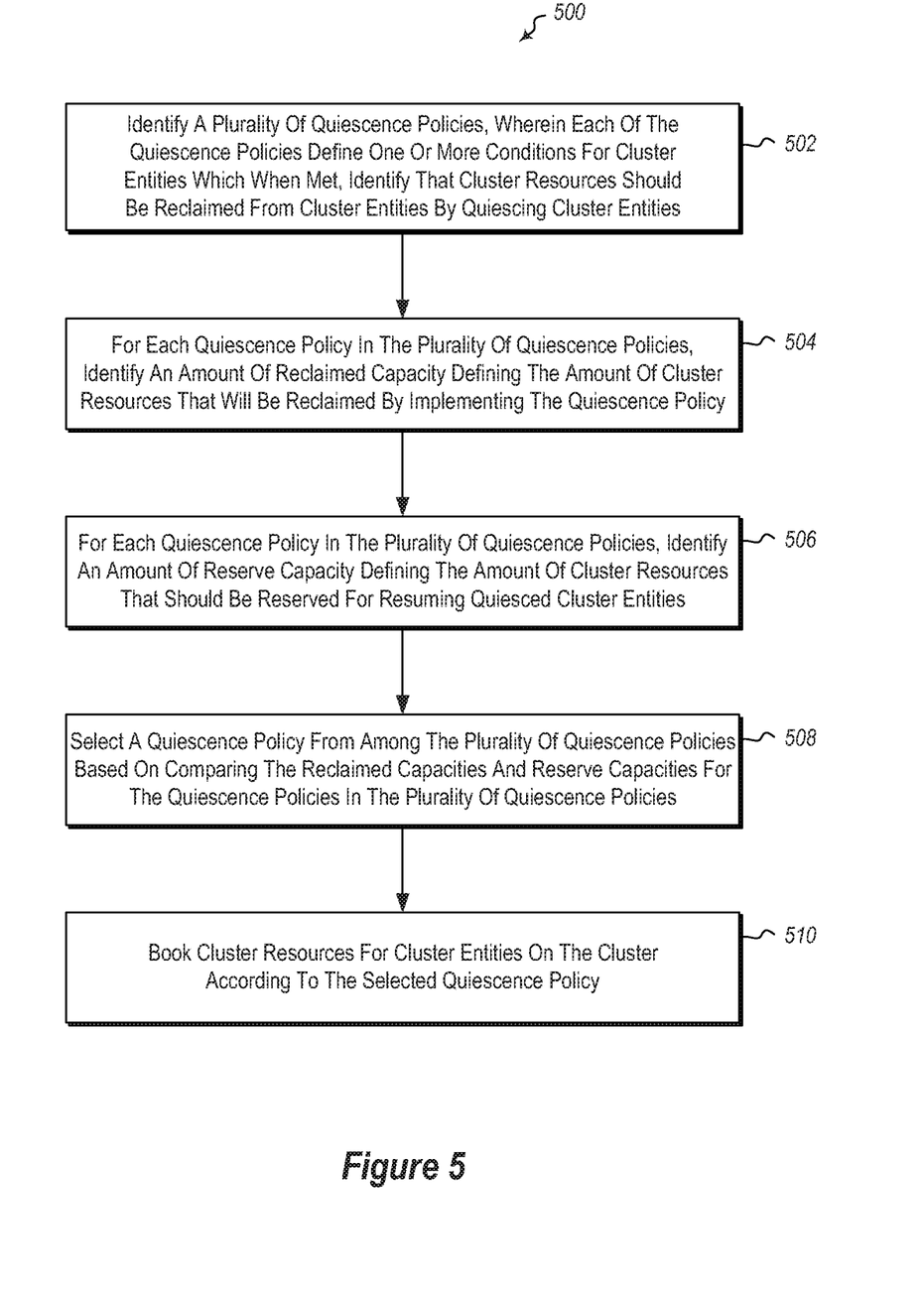
FIG. 5 illustrates a method of managing cluster resources for a cluster.

Referring now to FIG. 5, a method 500 is illustrated.

The method 500 may be practiced in a computing environment. The method 500 includes acts for managing cluster resources for a cluster.

The method 500 includes identifying a plurality of quiescence policies, wherein each of the quiescence policies define one or more conditions for cluster entities which when met, identify that cluster resources should be reclaimed from cluster entities by quiescing cluster entities (act 502). Thus for example, a quiescence policy may define an amount of idle time for a cluster entity (such as a database or other cluster entity). If the cluster entity has been idle for the idle time, then the cluster entity should be quiesced to free-up cluster resources, such as CPU cores, memory resources, disk I/O resources, network resources, etc.

The method 500 further includes, for each quiescence policy in the plurality of quiescence policies, identifying an amount of reclaimed capacity defining the amount of cluster resources that will be reclaimed by implementing the quiescence policy (act 504). Thus, different policies will result in different amounts of resources being reclaimed. For example, a lower idle time in one policy will result in more resources being reclaimed than a higher idle time in another policy. Embodiments can identify the amount of resources that are likely to be reclaimed for a cluster for each of these different policies.

The method 500 further includes, for each quiescence policy in the plurality of quiescence policies, identifying an amount of reserve capacity defining the amount of cluster resources that should be reserved for resuming quiesced cluster entities (act 506). Thus for example, a policy specifying a lower idle time will require more reserve capacity than a policy specifying a higher idle time. These reserve capacities can be identified for each of the policies.

The method 500 further includes, selecting a quiescence policy from among the plurality of quiescence policies based on comparing the reclaimed capacities and reserve capacities for the quiescence policies in the plurality of quiescence policies (act 508). For example, the most efficient quiescence policy from among the policies may be selected.

The method 500 further includes, booking cluster resources for cluster entities on the cluster according to the selected quiescence policy (act 510).

The method 500 may be practiced where identifying an amount of reclaimed capacity defining the amount of cluster resources that will be reclaimed by implementing the quiescence policy and identifying an amount of reserve capacity defining the amount of cluster resources that should be reserved for resuming quiesced cluster entities is performed by modeling application of quiescence policies to telemetry data. For example, such telemetry data may include recent real world telemetry data collected within a predetermined time frame from the cluster. For example, embodiments may use recently collected data and apply the recently collected data to models for each of the policies. This can be used to predict which policy will be best for future data coming into the cluster.

The telemetry data may include contextually relevant telemetry data collected from the cluster that is contextually relevant to a current or anticipated condition of the cluster. For example, telemetry data may be used to book cluster resources where the telemetry data has some contextual similarity to data anticipated at the cluster in the near future. For example, data traffic at the cluster may have some unique characteristics at holiday seasons. Thus, for example, embodiments may use year old telemetry data corresponding to some holiday season to predict cluster response to policies for a current holiday season.

The telemetry data may include synthesized telemetry data constructed from recent real world telemetry data collected within a predetermined time frame from the cluster and contextually relevant telemetry data collected from the cluster. Thus for example, while data may be cyclical due to times of the year, month, week or day, the data may also have some trending characteristic. For example, data traffic may be increasing in recent history. Thus, synthesized telemetry data could be modeled by biasing seasonal telemetry data with an increasing factor to represent both the seasonal telemetry data and the trending data.

The method 500 may further include identifying a resume cost for resuming quiesced cluster entities. In such embodiments, selecting a quiescence policy from among the plurality of quiescence policies may be based on the resume cost for resuming quiesced cluster entities. Thus, certain cluster resources may be required to resume quiesced cluster entities. This cost may be factored in to decisions regarding policy selection.

The method 500 may further include identifying a capacity compensation cost that may be incurred for failing to meet a service level agreement. In such embodiments, selecting a quiescence policy from among the plurality of quiescence policies may be based on the compensation cost. Thus, for example, the cluster provider may need to compensate tenants for missed SLAs. This cost may be figured in to decisions regarding policy selection.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable media having stored thereon instructions that are executable by the one or more processors to configure the computer system to perform a method of managing cluster resources for a cluster in a manner that increases service efficiency by detaching databases that are idle so as to reclaim cluster resources from the detached databases that are idle, but also reserving sufficient cluster resources to meet resources needed when detached databases are resumed, and wherein the instructions configure the computer system to perform at least the following:

identifying candidate databases that can be quiesced by detaching them so that cluster resources can be reclaimed, wherein the identification of the candidate databases is performed by identifying a plurality of quiescence policies, and wherein each of the quiescence policies define one or more conditions which when met, identify that cluster resources should be reclaimed from by detaching the candidate databases that meet the one or more conditions of one of the quiescence policies;

for each quiescence policy in the plurality of quiescence policies, identify an amount of reclaimed capacity defining the amount of cluster resources that will be reclaimed by detaching any database that meets the one or more conditions of the quiescence policy when implementing the quiescence policy;

for each quiescence policy in the plurality of quiescence policies, identify an amount of reserve capacity defining the amount of cluster resources that should be reserved in the event a detached database that meets the one or more conditions of the quiescence policy is resumed;

select a quiescence policy from among the plurality of quiescence policies that represents an attempt to optimize potential reclaimed cluster resources by using telemetry data collected from the cluster to model application of quiescence policies by comparing the reclaimed capacities and reserve capacities for each of the quiescence policies in the plurality of quiescence policies, and wherein the attempt to optimize comprises selecting a quiescence policy that attempts to maximize the reclaimed capacity of cluster resources for detached databases while minimizing the reserved capacity of cluster resources required for resumed databases; and book cluster resources for cluster entities on the cluster according to the selected quiescence policy.

2. The computer system of claim 1, wherein the telemetry data comprises recent real world telemetry data collected within a predetermined time frame from the cluster.

3. The computer system of claim 1, wherein the telemetry data comprises recent real world telemetry data collected within a predetermined time frame from the cluster.

4. The computer system of claim 1, wherein the telemetry data comprises the telemetry data comprises recent real world telemetry data collected within a predetermined time frame from the cluster and contextually relevant telemetry data collected from the cluster that is contextually relevant to a current or anticipated condition of the cluster.

5. The computer system of claim 1, wherein the one or more computer-readable media further have stored thereon instructions that are executable by the one or more processors to configure the computer system to identify a resume cost for resuming each detached database, and wherein selecting a quiescence policy from among the plurality of quiescence policies is based on the resume cost for resuming each detached database.

6. The computer system of claim 1, wherein the one or more computer-readable media further have stored thereon instructions that are executable by the one or more processors to configure the computer system to identify a capacity compensation cost that may be incurred for failing to meet a service level agreement for a resumed database, and wherein selecting a quiescence policy from among the plurality of quiescence policies is based on the compensation cost.

7. In a computing environment, a method of managing cluster resources for a cluster; in a manner that increases service efficiency by detaching databases that are idle so as to reclaim cluster resources from the detached databases that are idle, but also reserving sufficient cluster resources to meet resources needed when detached databases are resumed, and wherein the method comprises:

identifying candidate databases that can be quiesced by detaching them so that cluster resources can be reclaimed, wherein the identification of the candidate databases is performed by identifying a plurality of quiescence policies, and wherein each of the quiescence policies define one or more conditions which when met, identify that cluster resources should be reclaimed by detaching the candidate databases that meet the one or more conditions of one of the quiescence policies;

for each quiescence policy in the plurality of quiescence policies, identifying an amount of reclaimed capacity defining the amount of cluster resources that will be reclaimed by detaching any database that meets the one or more conditions of the quiescence policy when implementing the quiescence policy;

for each quiescence policy in the plurality of quiescence policies, identifying an amount of reserve capacity defining the amount of cluster resources that should be reserved in the event a detached database that meets the one or more conditions of the quiescence policy is resumed;

selecting a quiescence policy from among the plurality of quiescence policies that represents an attempt to optimize potential reclaimed cluster resources by using telemetry data collected from the cluster to model application of quiescence policies by comparing the reclaimed capacities and reserve capacities for each of the quiescence policies in the plurality of quiescence policies, and wherein the attempt to optimize comprises selecting a quiescence policy that attempts to maximize the reclaimed capacity of cluster resources for detached databases while minimizing the reserved capacity of cluster resources required for resumed databases; and booking cluster resources for cluster entities on the cluster according to the selected quiescence policy.

8. The method of claim 7, wherein the telemetry data comprises recent real world telemetry data collected within a predetermined time frame from the cluster.

9. The method of claim 7, wherein the telemetry data comprises recent real world telemetry data collected within a predetermined time frame from the cluster.

10. The method of claim 7, wherein the telemetry data comprises the telemetry data comprises recent real world telemetry data collected within a predetermined time frame from the cluster and contextually relevant telemetry data collected from the cluster that is contextually relevant to a current or anticipated condition of the cluster.

11. The method of claim 7, further comprising identifying a resume cost for resuming each detached database, and wherein selecting a quiescence policy from among the plurality of quiescence policies is based on the resume cost for resuming each detached database.

12. The method of claim 7, further comprising identifying a capacity compensation cost that may be incurred for failing to meet a service level agreement for a resumed database, and wherein selecting a quiescence policy from among the plurality of quiescence policies is based on the compensation cost.

13. A cluster system comprising:
a plurality of cluster resources;
a plurality of cluster entities deployed on the cluster resources; and
wherein the cluster system comprises one or more processors and one or more computer-readable media having stored thereon instructions that are executable by the one or more processors to configure the cluster system to perform a method of managing cluster resources for a cluster in a manner that increases service efficiency by detaching databases that are idle so as to reclaim cluster resources from the detached databases that are idle, but also reserving sufficient cluster resources to meet resources needed when detached databases are resumed, and wherein the instructions configure the cluster system to perform at least the following:
identifying candidate databases that can be quiesced by detaching them so that cluster resources can be reclaimed, wherein the identification of the candidate databases is performed by identifying a plurality of quiescence policies, and wherein each of the quiescence policies define one or more conditions which when met, identify that cluster resources should be reclaimed by detaching the candidate databases that meet the one or more conditions of one of the quiescence policies;
for each quiescence policy in the plurality of quiescence policies, identifying an amount of reclaimed capacity defining the amount of cluster resources that will be reclaimed by detaching any database that meets the one or more conditions of the quiescence policy when implementing the quiescence policy;
for each quiescence policy in the plurality of quiescence policies, identifying an amount of reserve capacity defining the amount of cluster resources that should be reserved in the event a detached database that meets the one or more conditions of the quiescence policy is resumed;
selecting a quiescence policy from among the plurality of quiescence policies that represents an attempt to optimize potential reclaimed cluster resources by using telemetry data collected from the cluster to model application of quiescence policies by comparing the reclaimed capacities and reserve capacities for each of the quiescence policies in the plurality of quiescence policies, and wherein the attempt to optimize comprises selecting a quiescence policy that attempts to maximize the reclaimed capacity of cluster resources for detached databases while minimizing the reserved capacity of cluster resources required for resumed databases; and
booking cluster resources for cluster entities on the cluster according to the selected quiescence policy.

14. The cluster system of claim 13, wherein the telemetry data comprises recent real world telemetry data collected within a predetermined time frame from the cluster.

15. The cluster system of claim 13, wherein the telemetry data comprises recent real world telemetry data collected within a predetermined time frame from the cluster.

16. The cluster system of claim 13, wherein the telemetry data comprises the telemetry data comprises recent real world telemetry data collected within a predetermined time frame from the cluster and contextually relevant telemetry data collected from the cluster that is contextually relevant to a current or anticipated condition of the cluster.

17. The cluster system of claim 13, further comprising identifying a capacity compensation cost that may be incurred for failing to meet a service level agreement for a resumed database, and wherein selecting a quiescence policy from among the plurality of quiescence policies is based on the compensation cost.

18. The cluster system of claim 13, wherein the cluster system is further configured to identify a resume cost for resuming each detached database, and wherein selecting a quiescence policy from among the plurality of quiescence policies is based on the resume cost for resuming each detached database.

* * * * *